United States Patent
Hyland et al.

(10) Patent No.: US 10,520,600 B1
(45) Date of Patent: Dec. 31, 2019

(54) METHODS AND SYSTEMS FOR AUTOMATED MISSION AREA SEGMENTATION

(71) Applicants: John C. Hyland, Panama City, FL (US); Cheryl Smith, Panama City, FL (US)

(72) Inventors: John C. Hyland, Panama City, FL (US); Cheryl Smith, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 413 days.

(21) Appl. No.: 15/467,702

(22) Filed: Mar. 23, 2017

(51) Int. Cl.
*G01S 15/89* (2006.01)

(52) U.S. Cl.
CPC .................................. *G01S 15/89* (2013.01)

(58) Field of Classification Search
CPC ........... G01S 15/89; G01S 15/88; G01V 1/00; G01V 1/302; G01V 1/345; G01V 1/38
See application file for complete search history.

(56) References Cited

PUBLICATIONS

Kamgar-Parsi et al., Underwater Imaging with a Moving Acoustic Lens, Jan. 1998, IEEE Transactions on Image Processing, vol. 7, No. 1, pp. 91-99 (Year: 1998).*

* cited by examiner

*Primary Examiner* — Toan M Le
(74) *Attorney, Agent, or Firm* — James T. Shepherd

(57) ABSTRACT

Methods for segmenting an ocean bottom area into multiple homogenous, rectangular sub-mission areas and generating new, composite sensor performance functions for each sub-mission area are provided. The method discretizes each voxel into a plurality of equally sized, square range bins and obtains a mean P-of-Y curve for each row and column based on a bottom characterization for each of the voxels. Zone parameters along each direction are iteratively calculated, with adjacent zones merged when their parameters are within predetermined values. Pooled variances are calculated for each direction and a preferred mission direction is chosen based on the direction with the smallest pooled variance.

14 Claims, 2 Drawing Sheets

METHODS AND SYSTEMS FOR AUTOMATED MISSION AREA SEGMENTATION

STATEMENT OF GOVERNMENT INTEREST

The invention described herein may be manufactured and used by or for the Government of the United States of America for governmental purposes without the payment of any royalties.

CROSS REFERENCE TO RELATED APPLICATION

Pursuant to 35 U.S.C. § 119, the benefit of priority from provisional application 62/326,256, with a filing date of Apr. 22, 2016, is claimed for this non-provisional application.

BACKGROUND OF THE INVENTION

(1) Field of the Invention

The present invention relates to ocean bottom mapping. More particularly, the present invention relates to methods and systems to segment an ocean bottom area into multiple homogenous, rectangular sub-mission areas and generate new, composite sensor performance functions for each sub-mission area.

(2) Description of the Prior Art

The U.S. government and military, as well as private industry, rely on National Oceanic and Atmospheric Administration (NOAA) seafloor characterization data for various ocean operations including shipping, oil exploration, fisheries management and Naval maneuvers. Features such as bottom composition (rock, sand, mud, etc.), water depth, currents, ripples, ripple direction, coral, salinity, shell beds, and bottom slope directly affect operational effectiveness. Hence, accurately characterizing the seafloor is paramount.

To date, NOAA has produced nearly one thousand nautical charts covering 95,000 miles of U.S. coastlines. Thus, environmental characterization information about an ocean bottom search area is usually known a priori to some known level of resolution. Currently, NOAA maintains publicly available bathymetry data measured at one-arc-minute intervals. More recent nautical cartography techniques can fuse coarse, historical data with modern sonar data to produce bathymetry plots with a twelve-meter square grid size.

Modern day seafloor surveying and classification primarily uses high frequency, side-scan sonar either towed by a surface ship or installed on an autonomous underwater vehicle (AUV). The quality of the side-scan sonar's image is usually represented by image pixel resolution and a plot of signal-to-noise ratio (SNR) versus lateral range. SNR varies significantly depending on the operating environment and the sonar's altitude above the bottom.

Under good environmental conditions, high frequency side-scan sonars can produce extremely detailed seafloor images that reveal fine details, including bottom contour, sand ripples, ridges, mine shapes and man-made objects. For military search operations, such as mine hunting, the SNR curve is typically transformed into a probability of detection (Pd) curve for a particular mine type with a specified false alarm rate. Such curves are also called P-of-Y curves.

Many sonar sensors accumulate sensor data over more than one dimension. For instance, a synthetic aperture sonar (SAS) forms a synthetic aperture sonar beam by fusing multiple (N), successive sonar ping datum along a relatively straight and level trajectory. The Pd versus lateral range curve, then, is based on the underlying assumptions that the SAS has accumulated two-dimensional data from N successive sonar data pings and that the sonar's flight through the water is straight and level. When, and only when, these conditions are met does the Pd versus lateral range accurately characterize SAS performance.

In addition to straight and level flight through the water, SAS operates at a fixed height off of the bottom and at a constant speed. Overall, these motion restrictions constrain SAS search patterns to be a series of uniformly spaced parallel search tracks across the search area. Hence, this repeatedly applies the same Pd to all possible targets or bottom features at the same lateral range. This creates parallel lines of constant Pd which effectively shrinks the coverage analysis from two dimensions to one dimension, thereby reducing the computational complexity.

Today's mine countermeasures planning tools typically accept search area size, desired clearance level, navigation error and the search sensor's P-of-Y curve. They then calculate required track spacing. Thus, by making a series of parallel, mow-the-lawn tracks that cover the mission area at the calculated track spacing, the search sensor will meet or exceed the desired clearance level.

Historically, NOAA has used depth to characterize the ocean. However, bottom composition (sand, mud, or rock), bottom roughness, clutter density, and percentage of mine case burial can also be used to characterize the ocean bottom. These four parameters are then fused into an overall bottom rating comprised of a letter (A, B, C, or D) and a number (1, 2, or 3). Ideally, the mission planner should have a separate P-of-Y curve for all possible bottom characterization categories. Unfortunately, given a number/letter bottom classification, the mission analyst cannot always uniquely determine the four environmental parameters that comprise that bottom classification.

Sonar science has long known that in addition to the historical bottom classification actors, many other environmental factors (salinity, sea state, reverberation, sound velocity profiles, etc.) and sonar parameters (frequency, beam width, source level, etc.) significantly affect sonar performance. As sonar system engineers have gained a better understanding of these factors, they have been able to improve sonar performance through better design. For example, if a sonar system is capable of operating at two different frequencies, then the sonar operator could choose the particular frequency that was best for the particular search scenario.

Ideally, the sonar would then have a specific P-of-Y curve for all possible sets of performance parameters used to classify the environment. Although this approach would greatly increase the amount of data needed to characterize a mission scenario, it provides more accurate P-of-Y curve characterizations given the mission scenario. Current mission planning tools for military ocean bottom surveys use only the historical bottom classification and cannot accommodate other environmental parameters.

Some modern bottom classification techniques use the actual signal returned to the sonar to classify the bottom. This involves signal processing the sonar data, extracting wavelet-based environmental features, performing spectral clustering and training a variational Bayesian Gaussian mixture model. The mixture model combines the resulting environmental estimates with measured platform motion to predict SAS image quality. Depending on the accuracy of the approach, such real-time techniques can achieve good segmentation results. However, because they rely on the actual sonar data, they cannot be utilized to pre-plan a search mission.

Thus, a need has been recognized in the state of the art to develop methods and systems to obtain specific P-of-Y curves for all possible sets of performance parameters used to classify the environment. There is a further need to provide more accurate P-of-Y curve characterizations without greatly increasing the amount of data needed to characterize a mission scenario. Further, there is a need to develop mission planning tools for ocean bottom surveys, which can accommodate other environmental parameters besides historical bottom classifications. Additionally, there is a need to develop methods and systems which can be used to achieve good segmentation results without relying on actual sonar data developed during the mission.

SUMMARY OF THE INVENTION

It is therefore a general purpose and primary object of the present invention to provide methods and systems to segment an ocean bottom area into multiple homogenous, rectangular sub-mission areas and generate new, composite sensor performance functions for each sub-mission area. The composite sensor performance functions are subsequently fed to a track spacing calculator, which determines specific sensor deployment parameters such as track spacing, height off of bottom, etc. The methods and systems can accommodate both existing and newly proposed ocean bottom characterization methods.

In one embodiment, a method of segmenting an ocean bottom area includes gridding the bottom area into multiple rows and columns of rectangular voxels, discretizing each rectangular voxel into a plurality of equally sized, square range bins and obtaining a mean P-of-Y curve for each row and column based on a bottom characterization for each of the voxels. The method further calculates new zone parameters along a first line of voxels of the new zone in a first direction and calculates next zone parameters along a next line of voxels adjacent the line of voxels of the new zone.

Additionally, the method determines if the parameters of the new and next zones are within predetermined values of each other, merges the next zone into the new zone if the parameters are within the predetermined values, or creates a new zone from the next zone when the parameters are not within the predetermined values. The method iteratively returns to calculating the next zone parameters until all lines in the first direction are processed.

The method obtains the mean P-of-Y curve from $$1/M \sum_{n=1}^{M} Pd(r_k \mid b_n),$$

where M equals the number of rectangular voxels along the line for which the mean is being obtained and $Pd(r_k \mid b_n)$ equals the P-of-Y curve as a function of lateral range $r_k$ given the bottom characterization $b_n$, with range r discretized into K of the square range bins. The calculated zone parameters include a sum, $PYsum(b_n)=\Sigma_{r_k} Pd(r_k \mid b_n)$, and a sum squared, $PYsumsq(b_n)=\Sigma_{r_k} Pd(r_k \mid b_n)^2$, determined over all $r_k$ inside a predetermined cutoff region; and a zone sum, $Zsum(I)=\Sigma_I PYsum(b_n)$, and a zone sum squared, $Zsumsq(I)=\Sigma_I PYsumsq(b_n)$, determined over all voxels along the line for which the parameters are being calculated.

The method merges the next zone into the new zone if a test statistic, TS, is not greater than a first predetermined value. Here, TS=abs(CZmean(n)−NZmean)/sigmapooled, CZmean(n) equals a mean P-of-Y for the new zone, NZmean equals a mean P-of-Y for the next zone and sigmapooled equals a square root of a pooled variance of CZmean(n) and NZmean as taken from the parameters. The next zone is also merged into the new zone if TS is greater than the first predetermined value, but abs(CZmean(n)−NZmean) is not greater than a second predetermined value. As used herein, merging includes updating the parameters for the new zone to include the next zone.

The method can also include obtaining a pooled variance for the first direction, returning to calculate new zone parameters using a direction orthogonal to the first direction as the first direction. A pooled variance for the orthogonal direction is obtained when all lines in the orthogonal direction are processed and a preferred mission direction is selected based on the direction having the smallest pooled variance.

In one embodiment, a method of segmenting an ocean bottom area includes gridding the bottom area into multiple rows and columns of rectangular voxels and discretizing each rectangular voxel into a plurality of equally sized, square range bins. A mean P-of-Y curve is obtained for each row and column from $$1/M \sum_{n=1}^{M} Pd(r_k \mid b_n),$$

where M equals the number of rectangular voxels along a line for which the mean is being obtained and $Pd(r_k \mid b_n)$ equals the P-of-Y curve as a function of lateral range $r_k$ given a bottom characterization $b_n$ for each voxel, with range r discretized into K of said equally sized, square range bins.

New zone parameters are calculated along a first line of voxels of the new zone in a first direction and next zone parameters are calculated along a next line of voxels adjacent the line of voxels of the new zone. If the parameters of the new and next zones are within predetermined values of each other, the parameters for the new zone are updated to include the next zone. If the parameters are not within the predetermined values, a new zone is created from the next zone.

The method iteratively returns to calculating next zone parameters until all lines in the first direction are processed. Once the first direction is processed a pooled variance for the first direction is obtained and the method returns to calculating new zone parameters using a direction orthogonal to the first direction as the first direction. The pooled variance for the orthogonal direction is obtained when all lines in the orthogonal direction are processed. The preferred mission direction is selected as the direction having the smallest pooled variance.

In one embodiment, a method of determining a preferred mission direction for an ocean bottom area includes gridding the bottom area into multiple rows and columns of rectangular voxels and discretizing each rectangular voxel into a plurality of equally sized, square range bins. A mean P-of-Y curve is obtained for each row and column from $$1/M \sum_{n=1}^{M} Pd(r_k \mid b_n),$$

where M equals the number of rectangular voxels along a line for which the mean is being obtained and $Pd(r_k \mid b_n)$ equals the P-of-Y curve as a function of lateral range $r_k$ given a bottom characterization $b_n$ for each voxel, with range r discretized into K of said equally sized, square range bins.

For each direction, new zone parameters are calculated along a first line of voxels of the new zone and next zone parameters are calculated along a next line of voxels adjacent the line of voxels of the new zone. If the parameters of the new and next zones are within predetermined values of each other, the parameters for the new zone are updated to include the next zone. If the parameters are not within the predetermined values, a new zone is created from the next zone.

The method iteratively returns to calculating next zone parameters until all lines in each direction are processed. A pooled variance for each direction is obtained and the method selects the preferred mission direction as the direction having the smallest pooled variance. The parameters and test statistic used in determining if the next zone is merged with the new zone or is taken as the new zone remain as described herein for other embodiments.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE INVENTION

Figure 1:
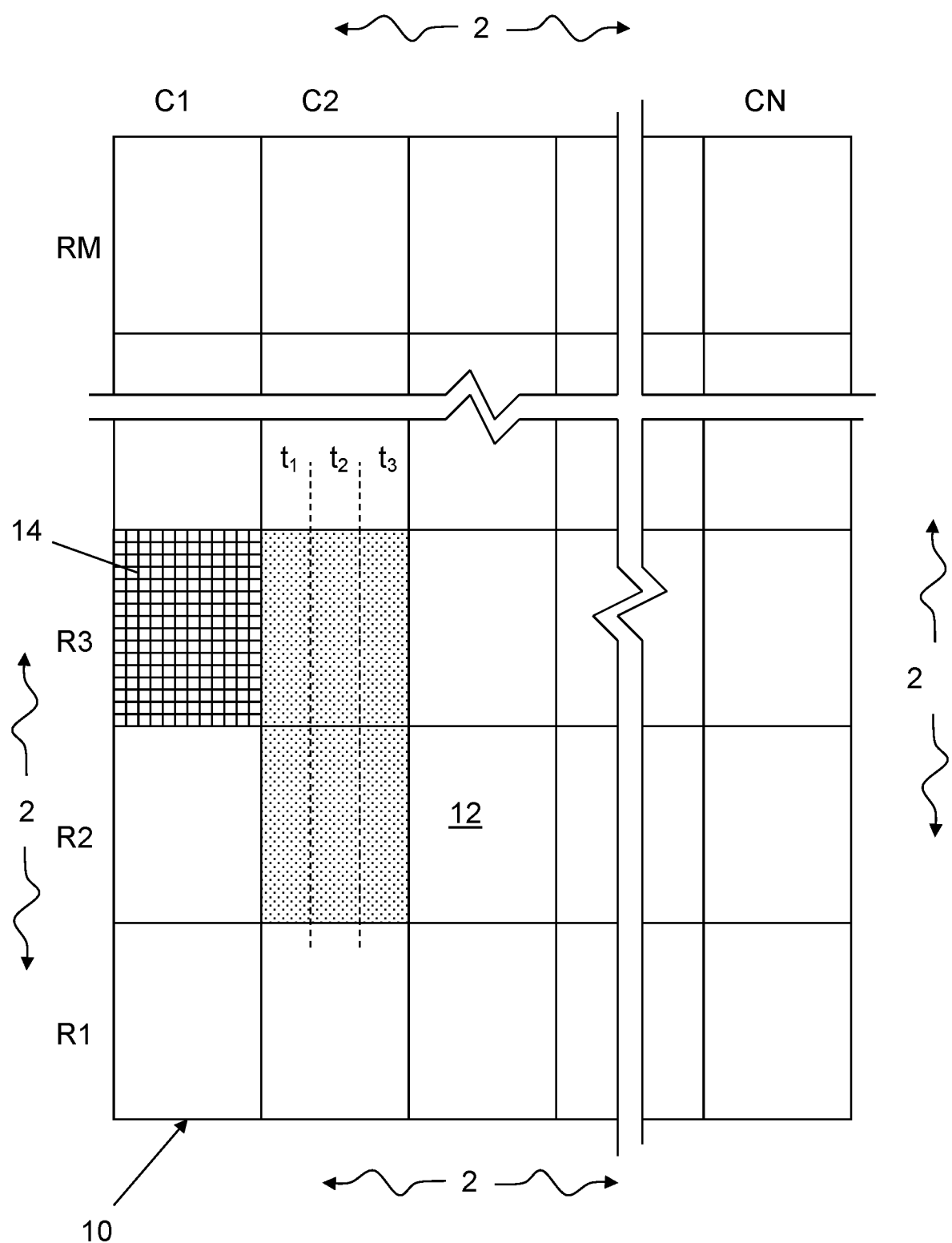
FIG. 1 illustrates a schematic plan view of a bottom grid structure.

Referring now to FIG. 1, there is shown a schematic plan view of seafloor 2 having grid structure 10 imposed thereon. Rows R1, R2, R3 through RM and columns C1, C2 through CN of grid structure 10 are composed of rectangular elements 12 (only one of which is designated in FIG. 1 for clarity). As previously described hereinbefore, a sensor will perform parallel tracks over grid structure 10 so as to survey and classify seafloor 2. Each element 12, or coarse environmental characterization voxel 12, comprises a plurality of smaller square voxels 14, representing the sensor P-of-Y grid corresponding to the P-of-Y curve's discretized resolution. For clarity, but not limitation, square voxels 14 are illustrated in only one element 12.

Calculating parallel, or mow-the-lawn search pattern track separation requires some sort of bottom characterization such that track planning algorithms can utilize the correct P-of-Y curves for the location at hand. Additionally, creating an automated segmentation method to accommodate both the current bottom classification standards and the newly proposed critical performance parameters poses some difficulty.

Considering the above factors along with typical sensor platform motion requirements of relatively straight and level flight, an automated area segmentation algorithm can be used with a large variety of bottom characterization methods, given a number of constraints. First, the mission area must be rectangular, as illustrated by grid structure 10 in FIG. 1. Second, the mission area must be pixelated into coarse, rectangular voxels, as shown by coarse voxels 12 in FIG. 1. Third, for each coarse voxel 12 the existing bottom characterization method must be converted to a single array index number that indicates the correct P-of-Y curve to use in corresponding voxel 12. Fourth, the lateral range of the P-of-Y curves must be less than the size of coarse area segmentation voxels 12, such that at least one entire P-of-Y curve is contained in a coarse voxel 12.

Given the above described constraints, segments of the resulting segmentation will be rectangular and will not overlap. Also, the composite of all the segments will encompass the entire mission area. Further, a rectangular segment will encompass the entire length of the area in the direction of the proposed mow-the-lawn tracks and all mow-the-lawn tracks will be parallel to each other. Finally, segmentation will be attempted along both rows and columns and the best result will be selected. Coarse voxels 12 and square voxels 14 are chosen such that grid 10 meets these constraints and has the required characteristics for partitioning in both directions. However, for ease of discussion, but not limitation, the following description is directed to segmentation or partitioning in the column direction. Those of skill in the art will recognize the methods described below apply equally to the row direction.

As previously discussed, typical bottom mapping missions employ a series of uniformly-spaced, parallel search tracks across the area of interest, e.g., tracks $t_1$, $t_2$ and $t_3$ in column C2 of grid 10 shown in phantom in FIG. 1. For mine detection operations, these uniformly-spaced, parallel search tracks repeatedly apply the same probability of detection (Pd) to all possible mines at the same off-track range, thereby creating parallel lines of constant Pd. This effectively reduces the computational complexity from two dimensions to one dimension. The series of parallel tracks is also consistent with typical sensor operating requirements of maintaining relatively straight and level flight at a constant speed.

However, various coarse voxels 12 may have differing bottom characterizations and thus, differing P-of-Y curves. In FIG. 1, this is illustrated as shading at voxels 12 corresponding to grid areas R2, C2 and R3, C2. The fact that all of the P-of-Y's down column C2 are not identical creates a problem. Recall the requirements state that the tracks must encompass the entire length of the area and must be parallel. Also, recall that the track spacing calculations require a P-of-Y curve. Neither the P-of-Y curve for shaded voxels 12 nor the P-of-Y curve of other voxels 12 in column C2 correctly characterizes the P-of-Y for the entire column C2.

An aggregated P-of-Y is needed to account for the different P-of-Y's. Define $Pd(r_k|b_n)$=P-of-Y$(b_n)$, where $Pd(r_k|b_n)$ equals the P-of-Y curve as a function of lateral range $r_k$ given bottom type $b_n$, with range r discretized into K equally sized range bins $r_k$, corresponding to square voxels 14. Now also define PdColumn$(r_k|c_j)$=PdC$(r_k|c_j)$= mean(Pd$(r_k|b_n)$) over all bottom types in column $c_j$:

$$PdC(r_k \mid c_j) = 1/M \sum_{n=1}^{M} Pd(r_k \mid b_n). \quad [1]$$

Since all course voxels 12 in mission area 10 have the same size, only one $Pd(r_k|b_n)$ needs to be added per voxel 12 to calculate an overall column mean.

Figure 2:
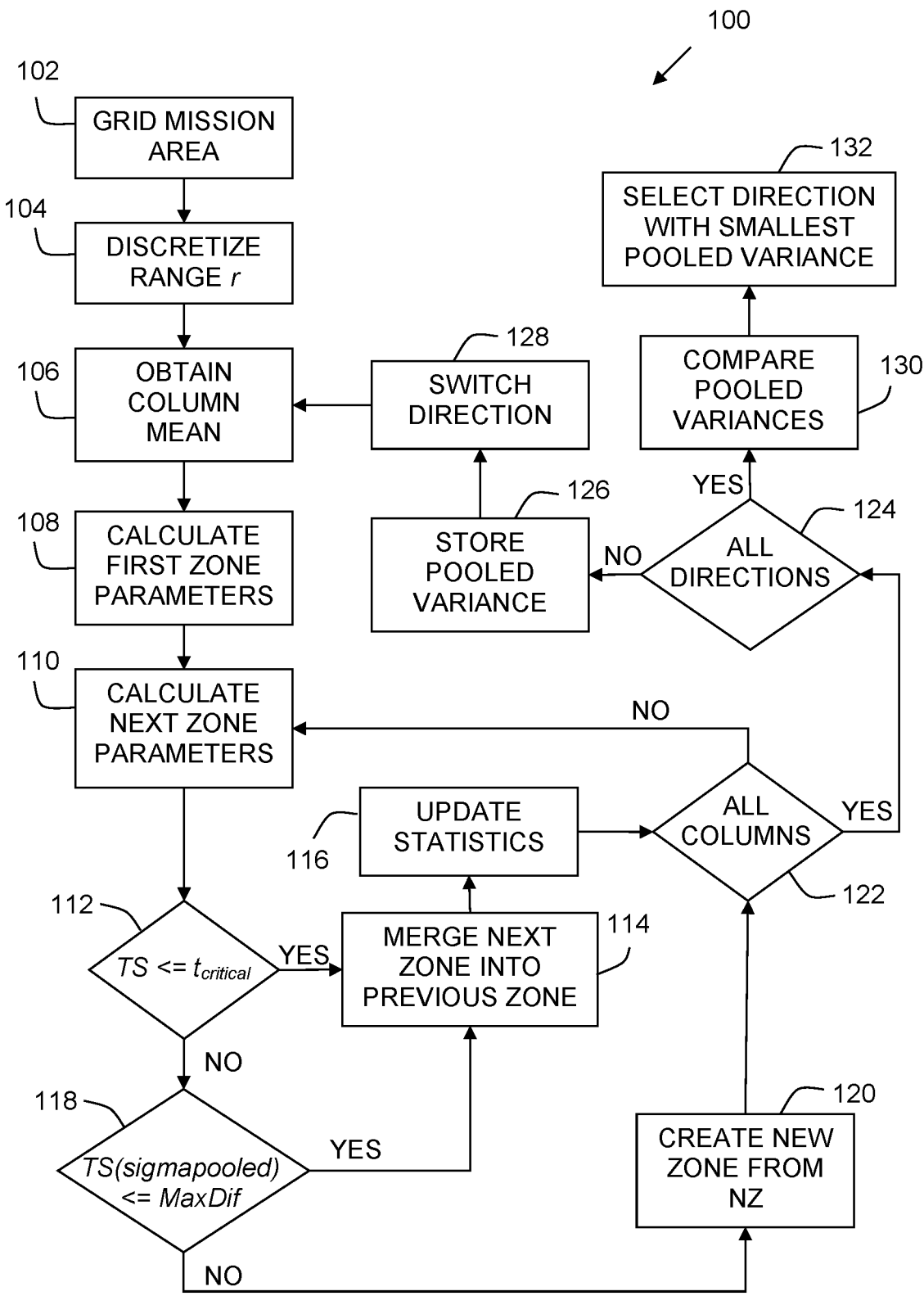
FIG. 2 illustrates a block diagram of a method for segmenting an ocean bottom area into multiple homogenous, rectangular sub-mission areas.

Referring now also to FIG. 2, there is shown a block diagram of method 100 for partitioning seafloor 2 into regions with relatively homogeneous P-of-Y performance.

Once mission area 10 is chosen and mission criteria set (as described in further detail hereinafter), block 102 grids area 10 into multiple rows and columns of coarse rectangular voxels 12. Typically, the size of coarse voxel 12 will be determined by the minimum resolution area for which bottom characterization data is available. Thus, a single bottom type $b_n$ can be associated with each coarse voxel 12 and the smallest possible sub-mission size will be one entire column or row.

At block 104, range r is discretized into K equally sized range bins $r_k$. The size of range bins $r_k$ is set by mission planning analysts depending on mission requirements, sensor performance and seafloor 2 characteristics. A typical value of range bin $r_k$ size is ten feet. Given the bottom characterization for each coarse voxel 12, the overall column mean is determined from equation [1] presented above (block 106).

In addition to column mean, method 100 partitions the entire mission area 10 into regions with relatively homogeneous P-of-Y performance. Choosing when to combine adjacent columns is based on a robust t-test that quantifies how similar one sub-mission area is to an adjacent sub-area. In so doing method 100 will only compare those portions of the P-of-Y curves that are within a cutoff region. As in the case of range bin $r_k$ size, the cutoff region is determined by mission analysts.

Block 108 calculates column parameters for a first column zone (CZ) I with the following statistics:

$$PYsum(b_n) = \Sigma_{r_k} Pd(r_k|b_n), \quad [2]$$

$$PYsumsq(b_n) = \Sigma_{r_k} Pd(r_k|b_n)^2, \quad [3]$$

$$CZsum(I) = \Sigma_I PYsum(b_n) \text{ and} \quad [4]$$

$$CZsumsq(I) = \Sigma_I PYsumsq(b_n), \text{ where} \quad [5]$$

$PYsum(b_n)$ and $PYsumsq(b_n)$ are determined over all $r_k$ inside the cutoff region; and CZsum(I) and CZsumsq(I) are determined over all rows in column I.

Having computed the statistics for CZ I, block 110 computes column parameters for the next column zone (NZ):

$$NZsum = \Sigma_{NC} PYsum(b_n) \text{ and} \quad [6]$$

$$NZsumsq = \Sigma_{NC} PYsumsq(b_n), \text{ where} \quad [7]$$

NZsum and NZsumsq are determined over all rows in the next column NC.

Block 112 compares the previous column zone, CZ, to the next column zone, NZ, using the test statistic, TS:

$$TS = abs(CZmean(n) - NZmean)/sigmapooled; \text{ and where} \quad [8]$$

CZmean(n) equals the mean P-of-Y for CZ(n), NZmean equals the mean P-of-Y for NZ and sigmapooled equals the square root of the pooled variance of CZmean(n) and NZmean, as determined from equations [2] through [7]. Those of skill in the art can recognize that TS has an absolute student T distribution with $J(n)+L-2$ degrees of freedom, where J(n) equals the number of P-of-Y points in CZ(n) and L equals the number of P-of-Y points in NZ.

If $TS \le t_{critical}$, then NZ is merged into CZ(n) (block 114) and the CZ(n) statistics are updated at (block 116). As known to those of skill in the art, the student T distribution provides various $t_{critical}$ values corresponding to differing confidence levels, as set by mission analysts. When $TS > t_{critical}$, this indicates the two zones CZ(n) and NZ have significantly different mean P-of-Y values. However, although the difference is statistically significant, unless it is also sufficiently large, NZ can still be merged with CZ(n). For example, given enough data, the above test could detect the difference between NZ=0.800 and CZ(n)=0.820.

However, for all practical purposes, any mission planning software would plan virtually identical track spacing for these means. Thus, NZ is also merged into CZ(n) when $TS > t_{critical}$ and abs(CZmean(n)−NZmean)≤MaxDif, as determined at block 118, where MaxDif is the largest acceptable difference of mean P-of-Y values set by mission planning. Otherwise, NZ is used to create a new column zone CZ(n+1), with new parameters and statistics for CZ(n+1) based on equations [1] through [5] (block 120). It is noted that abs(CZmean(n)−NZmean) can also be expressed as TS(sigmapooled) from equation [8].

Once NZ is merged (block 116) or CZ(n+1) is created (block 120), block 122 determines if all columns in grid 10 have been processed. If not, method 100 returns to block 110 to compute column parameters for the next column zone. In comparing zones at block 112, the previous column zone CZ is taken as the merged column zone from block 116, or the column zone CZ(n+1) created at block 120.

If all columns have been processed (block 122), block 124 determines if both orthogonal directions of grid 10 have been processed. If not, method 100 stores the pooled variance across the sub-areas for the first direction (block 126), switches to the second orthogonal direction as the column direction (block 128) and returns to block 106. If both orthogonal directions have been processed, block 130 compares the pooled variances of the first and second directions and block 132 selects the partitioning direction having the smallest pooled variance.

What has thus been described is a method for segmenting an ocean bottom area into multiple homogenous, rectangular, sub-mission areas and generating new, composite sensor performance functions for each sub-mission area. Method 100 first sets up a grid over the mission area and then determines an aggregate P-of-Y curve for each column or row in the grid. Method 100 then calculates adjacent zone statistics and parameters along a first direction of the grid, combining the zones when zone statistics are within acceptable limits.

When all zones are complete, method 100 obtains the pooled variance for the zones in the first direction. Method 100 then repeats the process in the orthogonal direction. Finally, method 100 compares the pooled variances of the first and orthogonal directions and selects the direction having the smallest pooled variance. The segmentation data from method 100 can be input to known track spacing tools, which calculate specific sensor deployment parameters such as track spacing, height off of bottom, etc.

Method 100 was tested using both rectangular and triangular a priori bottom segmentations. Additionally, two P-of-Y curve configurations were used: a set of three bi-modal curves and a set of three uni-modal curves. For each of these four scenarios, method 100 automatically partitioned the mission area across rows and down columns to create regions with homogeneous P-of-Y performance. The testing results indicated method 100 correctly segmented the rectangular a priori regions. For the triangular a priori segmentation, method 100 created reasonable rectangular sub-areas. Method 100 also calculated mean P-of-Y curves for each sub-area and utilized pooled variance statistics to compare the quality of row segmentation versus column segmentation.

In relation to previous segmentation methods, method 100 automatically segments the ocean bottom mission area into rectangular sub-regions of relatively homogeneous sensor performance by using a quantitative statistically-based performance measure. Existing tools do not segment the area and do not use any quantitative performance measure to characterize the bottom segmentation. Method 100 further calculates a new, aggregated P-of-Y curve for each sub-region. This more accurately represents the sensor's aggregate performance in each sub-region. Existing tools use a single P-of-Y for the entire area.

In extreme cases of bottom characterization varying greatly across the entire mission area, method 100 creates a continuum of P-of-Y's, such that the resulting track spacings smoothly transition across the mission area. Existing methods utilize a worst-case strategy, which creates a series of mow-the-lawn tracks that are unnecessarily too close and vary abruptly. Oversampling from this worst-case strategy can raise the false target rate without providing any meaningful improvement in probability of detection. Additionally, method 100 segments the rectangular area in both orthogonal directions over the mission area and provides a statistical measure of which segmentation direction is superior. While existing tools can calculate required track spacing for either direction, they do not provide a measure of which segmentation direction is superior.

Obviously many modifications and variations of the present invention may become apparent in light of the above teachings. For example, the above description generally focuses on mine countermeasure applications with specific focus on ocean bottom surveys. However, the methods and techniques apply to any type of ocean survey method in which the search/survey sensor's performance varies as a function of the environmental parameters and the environmental parameters vary over the entire mission area. Examples of such surveys include, but are not limited to, searching for sunken ships, missing airplanes and treasure. Alternately, the method described herein applies to searching for objects in the water column such as submarines, weapons and marine mammals, searching for objects beneath the sea floor such as oil and gas deposits and searching for objects on the surface of the ocean such as people adrift, ships and floating mines.

Additionally, the configuration of blocks in method 100 can be changed to suit the requirements of the mission processing equipment. For example, method 100 is described as processing in a first direction along the grid and subsequently processing in the orthogonal direction. Those of skill in the art will recognize that method 100 can proceed from block 106 through block 122 in both grid directions simultaneously with comparison of the pooled variances being performed once both directions have been processed.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method of deploying at least one sensor over an ocean bottom area, comprising:
   gridding said bottom area into multiple rows and columns of rectangular voxels;
   discretizing each said rectangular voxel into a plurality of equally sized, square range bins;
   obtaining, for each said row and column based on a bottom characterization for each said voxel, a mean P-of-Y curve from $$1/M \sum_{n=1}^{M} Pd(r_k | b_n),$$

where M equals a number of said rectangular voxels along a line for which said mean is being obtained and $Pd(r_k|b_n)$ equals said P-of-Y curve as a function of lateral range $r_k$ given said bottom characterization $b_n$, with range r discretized into K of said equally sized, square range bins;
   calculating new zone parameters along a first line of said voxels of said new zone in a first direction;
   calculating next zone parameters along a next line of voxels adjacent said line of said voxels of said new zone in said first direction;
   determining if said parameters of said new and next zones are within predetermined values of each other;
   merging said next zone into said new zone if said parameters are within said predetermined values;
   creating a new zone from said next zone when said parameters are not within said predetermined values;
   iteratively returning to calculating next zone parameters, determining and one of merging and creating until all lines in said first direction are processed;
   inputting said parameters to a track spacing calculator; and
   controlling deployment of said at least one sensor based on said track spacing calculations.

2. The method of claim 1, wherein said zone parameters comprise:
   a sum, $PYsum(b_n)=\Sigma_{r_k}Pd(r_k|b_n)$, and a sum squared, $PYsumsq(b_n)=\Sigma_{r_k}Pd(r_k|b_n)^2$, determined over all $r_k$ inside a predetermined cutoff region; and
   a zone sum, $Zsum(I)=\Sigma_I PYsum(b_n)$, and a zone sum squared, $Zsumsq(I)=\Sigma_I PYsumsq(b_n)$, determined over all voxels along a line for which said parameters are being calculated.

3. The method of claim 2, wherein determining if said parameters of said new and next zones are within predetermined values of each other comprises:
   determining if a test statistic, TS, is not greater than a first predetermined value, where TS=abs(CZmean(n)−NZmean)/sigmapooled, CZmean(n) equals a mean P-of-Y for said new zone, NZmean equals a mean P-of-Y for said next zone and sigmapooled equals a square root of a pooled variance of CZmean(n) and NZmean taken from said parameters; and
   when TS is greater than said first predetermined value, determining if abs(CZmean(n)−NZmean) is not greater than a second predetermined value.

4. The method of claim 3, wherein merging further comprises updating said parameters for said new zone to include said next zone.

5. The method of claim 1, further comprising:
   obtaining a pooled variance for said first direction;
   returning to calculating new zone parameters using a direction orthogonal to said first direction as said first direction;
   obtaining a pooled variance for said orthogonal direction when all lines in said orthogonal direction are processed; and
   selecting as a preferred mission direction one of said first direction and said orthogonal direction having a smallest pooled variance.

6. The method of claim 5, wherein merging further comprises updating said parameters for said new zone to include said next zone.

7. The method of claim 5, wherein said zone parameters comprise:
a sum, $PYsum(b_n)=\Sigma_{r_k}Pd(r_k|b_n)$, and a sum squared, $PYsumsq(b_n)=\Sigma_{r_k}Pd(r_k|b_n)^2$, determined over all $r_k$ inside a predetermined cutoff region, where $Pd(r_k|b_n)$ equals said P-of-Y curve as a function of lateral range $r_k$ given said bottom characterization $b_n$, with range r discretized into K of said equally sized, square range bins; and
a zone sum, $Zsum(I)=\Sigma_I PYsum(b_n)$, and a zone sum squared, $Zsumsq(I)=\Sigma_I PYsumsq(b_n)$, determined over all voxels along a line for which said parameters are being calculated.

8. The method of claim 1, wherein merging further comprises updating said parameters for said new zone to include said next zone.

9. A method of deploying at least one sensor over an ocean bottom area, comprising:
gridding said bottom area into multiple rows and columns of rectangular voxels;
discretizing each said rectangular voxel into a plurality of equally sized, square range bins;
obtaining a mean P-of-Y curve for each said row and column from $$1/M \sum_{n=1}^{M} Pd(r_k | b_n),$$

where M equals a number of said rectangular voxels along a line for which said mean is being obtained and $Pd(r_k|b_n)$ equals said P-of-Y curve as a function of lateral range $r_k$ given a bottom characterization b for each said voxel, with range r discretized into K of said equally sized, square range bins;
calculating new zone parameters along a first line of said voxels of said new zone in a first direction;
calculating next zone parameters along a next line of voxels adjacent said line of said voxels of said new zone in said first direction;
determining if said parameters of said new and next zones are within predetermined values of each other;
updating said parameters for said new zone to include said next zone if said parameters are within said predetermined values;
creating a new zone from said next zone when said parameters are not within said predetermined values;
iteratively returning to calculating next zone parameters, determining and one of merging and creating until all lines in said first direction are processed;
obtaining a pooled variance for said first direction;
returning to calculating new zone parameters using a direction orthogonal to said first direction as said first direction;
obtaining a pooled variance for said orthogonal direction when all lines in said orthogonal direction are processed;
selecting as a preferred mission direction one of said first direction and said orthogonal direction having a smallest pooled variance; and
deploying said at least one sensor along said preferred mission direction.

10. The method of claim 9, wherein said zone parameters comprise:
a sum, $PYsum(b_n)=\Sigma_{r_k}Pd(r_k|b_n)$, and a sum squared, $PYsumsq(b_n)=\Sigma_{r_k}Pd(r_k|b_n)^2$, determined over all $r_k$ inside a predetermined cutoff region; and
a zone sum, $Zsum(I)=\Sigma_I PYsum(b_n)$, and a zone sum squared, $Zsumsq(I)=\Sigma_I PYsumsq(b_n)$, determined over all voxels along a line for which said parameters are being calculated.

11. The method of claim 10, wherein determining if said parameters of said new and next zones are within predetermined values of each other comprises:
determining if a test statistic, TS, is not greater than a first predetermined value, where TS=abs(CZmean(n)−NZmean)/sigmapooled, CZmean(n) equals a mean P-of-Y for said new zone, NZmean equals a mean P-of-Y for said next zone and sigmapooled equals a square root of a pooled variance of CZmean(n) and NZmean taken from said parameters; and
when TS is greater than said first predetermined value, determining if abs(CZmean(n)−NZmean) is not greater than a second predetermined value.

12. A method of deploying at least one sensor over a preferred mission direction for an ocean bottom area, comprising:
gridding said bottom area into multiple rows and columns of rectangular voxels;
discretizing each said rectangular voxel into a plurality of equally sized, square range bins;
obtaining a mean P-of-Y curve for each said row and column from $$1/M \sum_{n=1}^{M} Pd(r_k | b_n),$$

where M equals a number of said rectangular voxels along a line for which said mean is being obtained and $Pd(r_k|b_n)$ equals said P-of-Y curve as a function of lateral range $r_k$ given a bottom characterization $b_n$ for each said voxel, with range r discretized into K of said equally sized, square range bins;
for each direction along said grid:
calculating new zone parameters along a first line of said voxels of said new zone;
calculating next zone parameters along a next line of voxels adjacent said line of said voxels of said new zone;
determining if said parameters of said new and next zones are within predetermined values of each other;
updating said parameters for said new zone to include said next zone if said parameters are within said predetermined values;
creating a new zone from said next zone when said parameters are not within said predetermined values;
iteratively returning to calculating next zone parameters, determining and one of merging and creating until all lines in each direction are processed;
obtaining a pooled variance for each direction; and
selecting as a preferred mission direction said direction having a smallest pooled variance; and
deploying said at least one sensor along said preferred mission direction.

13. The method of claim 12, wherein said zone parameters comprise:

a sum, $PYsum(b_n) = \Sigma_{r_k} Pd(r_k|b_n)$, and a sum squared, $PYsumsq(b_n) = \Sigma_{r_k} Pd(r_k|b_n)^2$, determined over all $r_k$ inside a predetermined cutoff region; and a zone sum, $Zsum(I) = \Sigma_I PYsum(b_n)$, and a zone sum squared, $Zsumsq(I) = \Sigma_I PYsumsq(b_n)$, determined over all voxels along a line for which said parameters are being calculated.

14. The method of claim 13, wherein determining if said parameters of said new and next zones are within predetermined values of each other comprises:

determining if a test statistic, TS, is not greater than a first predetermined value, where TS=abs(CZmean(n)−NZmean)/sigmapooled, CZmean(n) equals a mean P-of-Y for said new zone, NZmean equals a mean P-of-Y for said next zone and sigmapooled equals a square root of a pooled variance of CZmean(n) and NZmean taken from said parameters; and when TS is greater than said first predetermined value, determining if abs(CZmean(n)−NZmean) is not greater than a second predetermined value.

\* \* \* \* \*